US012729576B2

(12) United States Patent
Netzer

(10) Patent No.: US 12,729,576 B2
(45) Date of Patent: Sep. 8, 2026

(54) GUIDE SYSTEM FOR GUIDING AT LEAST ONE MOVABLE FURNITURE PART

(71) Applicant: Julius Blum GmbH, Hoechst (AT)

(72) Inventor: Emanuel Netzer, Hoechst (AT)

(73) Assignee: JULIUS BLUM GMBH, Hoechst (AT)

( * ) Notice: Subject to any disclaimer, the term of this patent is extended or adjusted under 35 U.S.C. 154(b) by 0 days.

(21) Appl. No.: 18/922,851

(22) Filed: Oct. 22, 2024

(65) Prior Publication Data

US 2025/0043606 A1 Feb. 6, 2025

Related U.S. Application Data

(63) Continuation of application No. PCT/AT2023/060113, filed on Apr. 5, 2023.

(30) Foreign Application Priority Data

Apr. 29, 2022 (AT) .................................. 50296/2022

(51) Int. Cl.
*E05D 15/00* (2006.01)
*E05D 15/06* (2006.01)

(52) U.S. Cl.
CPC .... *E05D 15/0643* (2013.01); *E05Y 2800/404* (2013.01); *E05Y 2900/20* (2013.01)

(58) Field of Classification Search
CPC ............ E05D 15/0643; E05D 15/0647; E05D 15/264; E05D 15/34; E05D 15/28; E05D 15/30; E05D 15/32; E05D 15/58; E05D 3/06; E05D 3/08; E05D 3/14; E05D 3/16; E05D 2003/166; E05D 2015/586; E06B 7/36; E06B 7/367; E05Y 2600/53; E05Y 2800/404; E05Y 2900/20; E05Y 2900/212
See application file for complete search history.

(56) References Cited

U.S. PATENT DOCUMENTS 2,202,209 A * 5/1940 Kennedy ............. A47B 88/437 312/334.15
2,209,041 A * 7/1940 Sinchuk .................... E06B 3/44 292/77

(Continued)

FOREIGN PATENT DOCUMENTS

CN 108071288 5/2018
CN 215936762 3/2022

(Continued)

OTHER PUBLICATIONS

International Search Report issued Jun. 14, 2023 in International (PCT) Application No. PCT/AT2023/060113.

*Primary Examiner* — Chuck Y Mah
(74) *Attorney, Agent, or Firm* — Wenderoth, Lind & Ponack, L.L.P.

(57) ABSTRACT

A guide system includes a guide device for guiding a movable furniture part, the guide device being configured to guide the movable furniture part with a predetermined distance to a furniture wall. The guide system includes a gliding device separate from the guide device, the gliding device to be arranged on the movable furniture part or on the furniture wall such that the movable furniture part and the furniture wall can be brought into a gliding contact with each other via the gliding device when the predetermined distance becomes smaller.

20 Claims, 10 Drawing Sheets

(56) References Cited

U.S. PATENT DOCUMENTS

| | | | | |
|---|---|---|---|---|
| 2,953,809 | A * | 9/1960 | Nelson | E05D 15/264 16/402 |
| 3,280,507 | A * | 10/1966 | Kollsman | E05D 15/1042 49/130 |
| 3,300,897 | A | 1/1967 | Wikkerink | |
| 3,975,862 | A * | 8/1976 | Doan | E05D 15/08 16/96 R |
| 4,125,183 | A * | 11/1978 | Lang | B65G 39/12 16/46 |
| 5,070,926 | A * | 12/1991 | Behring | E05D 15/26 160/199 |
| 5,149,180 | A * | 9/1992 | Haab | E06B 3/5045 312/331 |
| 5,678,280 | A * | 10/1997 | Haab | E05D 15/0656 49/410 |
| 6,244,417 | B1 * | 6/2001 | Timmer | B65G 39/025 193/35 MD |
| 6,854,159 | B2 * | 2/2005 | Ruitenbeek | B60B 33/0073 16/42 R |
| 7,293,389 | B2 * | 11/2007 | Jacobs | E05D 15/0691 16/93 R |
| 9,284,761 | B2 | 3/2016 | Haab et al. | |
| 9,624,705 | B2 | 4/2017 | Haab et al. | |
| 10,080,435 | B2 * | 9/2018 | Janzen | E05F 5/08 |
| 10,988,971 | B1 | 4/2021 | Annazone, Jr. et al. | |
| 11,274,482 | B2 | 3/2022 | Rupp et al. | |
| 11,371,277 | B2 | 6/2022 | Meyer | |
| 11,512,514 | B2 * | 11/2022 | Blum | E06B 3/5054 |
| 12,091,897 | B2 | 9/2024 | Duer | |
| 2007/0180654 | A1 * | 8/2007 | Gasser | A47B 88/463 16/242 |
| 2008/0048538 | A1 * | 2/2008 | Karg | E05F 1/1066 312/319.2 |
| 2014/0150208 | A1 | 6/2014 | Haab et al. | |
| 2016/0201368 | A1 | 7/2016 | Haab et al. | |
| 2017/0260789 | A1 * | 9/2017 | Gabl | E05F 1/1025 |
| 2019/0284859 | A1 | 9/2019 | Rupp et al. | |
| 2020/0018108 | A1 * | 1/2020 | Sperger | E05D 15/58 |
| 2021/0156192 | A1 | 5/2021 | Meyer | |
| 2022/0074250 | A1 | 3/2022 | Duer | |

FOREIGN PATENT DOCUMENTS

| | | |
|---|---|---|
| DE | 1 584 189 | 4/1971 |
| DE | 20 2022 100 156 | 4/2022 |
| EP | 0 005 314 | 11/1979 |
| JP | 58-138777 | 9/1983 |
| JP | 9-242408 | 9/1997 |
| JP | 2003-135174 | 5/2003 |
| JP | 2007-321432 | 12/2007 |
| WO | 2018/129572 | 7/2018 |
| WO | 2020/232489 | 11/2020 |

* cited by examiner

GUIDE SYSTEM FOR GUIDING AT LEAST ONE MOVABLE FURNITURE PART

The present application is a continuation of International Application PCT/AT2023/060113 filed on Apr. 5, 2023. Thus, all of the subject matter of International Application PCT/AT2023/060113 is incorporated herein by reference.

BACKGROUND OF THE INVENTION

The present invention relates to a guide system for guiding at least one movable furniture part, in particular a door wing, in a direction extending parallel to at least one furniture wall. The guide system comprises at least one guide device for guiding the at least one movable furniture part, and the guide device being configured to guide the at least one movable furniture part with a predetermined distance to the at least one furniture wall.

Moreover, the invention relates to a gliding device for glidingly supporting a movable furniture part, in particular a door wing, on at least one, in particular stationary, furniture wall.

The invention further concerns an item of furniture comprising a furniture carcass, at least one movable furniture part, in particular a door wing, and at least one guide system and/or at least one gliding device of the type to be described.

WO 2018/129572 A1 discloses a guide system for moving two door wings hingedly connected to each other between a first position, in which the door wings are aligned substantially coplanar to each other, and a second position, in which the door wings are aligned substantially parallel to each other. In the second (parallel) position, the door wings can be countersunk within a lateral insertion compartment of the furniture carcass. The guide device includes a guide rail extending in a depth direction of the item of furniture, and a carrier for pivotally supporting a door wing. The carrier can be guided along the guide rail with a predetermined distance to a furniture wall. However, due to an excessive manual force application to the door wing in a direction extending transversely to the furniture wall, it may occur that a door wing collides with the furniture wall. As a result, the movement of the door wing is impeded or even blocked. Moreover, there is the danger that the door wings, the furniture wall and the components of the guide system can be damaged.

SUMMARY OF THE INVENTION

It is an object of the present invention to propose a guide system of the type mentioned in the introductory part and/or a compact gliding device for glidingly supporting the movable furniture part, thereby avoiding the above-discussed drawbacks.

According to a first variant of the invention, the guide system includes at least one gliding device separate from the guide device. The at least one gliding device is configured to be arranged on the at least one movable furniture part or on the at least one furniture wall such that the at least one movable furniture part and the at least one furniture wall can be brought into a gliding contact with each other via the gliding device when the predetermined distance becomes smaller.

In other words, according to the first variant of the invention, at least one gliding device is provided on which the movable furniture part, upon an excessive force application to the furniture part in a direction extending transversely to a longitudinal extension of the guide device, can be glidingly supported. In this way, the motion sequence of the movable furniture part can be harmonized and the movable furniture part, the furniture wall and/or the components of the guide system can be protected from damages.

According to a preferred embodiment, the at least one gliding device, in a condition in which the at least one movable furniture part is guided with the predetermined distance relative to the furniture wall, is without contact to the at least one movable furniture part or to the at least one furniture wall. In other words, a contact between the movable furniture part and the gliding device is only possible when the predetermined distance falls below a certain value due to a mechanical force application to the movable furniture part (for example in the case of misuse). This has the advantage that the movable furniture part and the gliding device only contact each other in an overload case. On the contrary, upon a movement of the movable furniture part with the predetermined distance to the furniture wall, no contact does occur. In this way, the frictional resistance can be considerably reduced upon a normal movement of the movable furniture part.

According to a second variant of the invention, a gliding device for glidingly supporting a movable furniture part, in particular a door wing, on at least one, in particular stationary, furniture wall is provided. The gliding device includes at least one movably-supported rolling body configured to support the movable furniture part. The gliding device includes at least one housing section configured to be at least partially countersunk within a, preferably cylindrical, recess of the movable furniture part or of the furniture wall.

In other words, according to the second variant of the invention, a gliding device with a housing section is provided, the housing section being configured to be partially countersunk within a recess, for example within a cylindrical bore, of the movable furniture part or of a furniture wall. This offers the possibility that the at least one rolling body of the gliding device can be partially countersunk within the furniture wall or within the movable furniture part. As a result, the gliding device can be designed significantly more compact, in particular flatter. Moreover, already existing hole grids for fixing the gliding device can be used which additionally increases the ease of assembly.

Preferably, the countersinkable housing section of the gliding device is configured to be arranged within a cylindrical bore which is usually provided in the furniture manufacture, preferably having a diameter of 35 mm. Such bores are usually also utilized for hinge cups of furniture hinges, and these bores can also be used so as to countersink the housing section of the gliding device.

BRIEF DESCRIPTION OF THE DRAWINGS

Further details and advantages of the present invention will be apparent from the following description of figures, in which.

DETAILED DESCRIPTION OF THE INVENTION

Figure 1A:
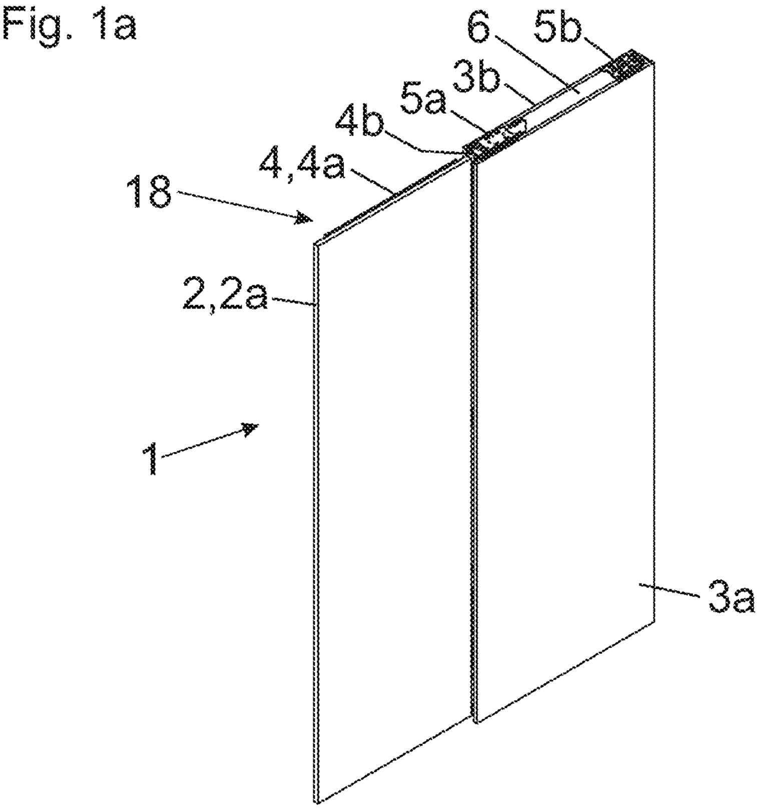
FIG. 1*a*, 1*b* show an item of furniture with a movable furniture part in two different positions.

FIG. 1*a* shows an item of furniture 1 having two furniture walls 3*a*, 3*b* spaced apart from each other in a parallel relationship between which at least one insertion compartment 6 for receiving a movable furniture part 2, preferably in the form of a door wing 2*a*, is formed. The two furniture walls 3*a*, 3*b* are connected to each other via spacer members 5*a*, 5*b*.

The movable furniture part 2 can be guided by a guide system 18 with a predetermined distance in a direction extending parallel to the furniture wall 3*a*, the guide system 18 comprising at least one guide device 4. In the shown embodiment, the guide device 4 includes a groove 4*a* and a guide element 4*b* configured to be partially engaged into the groove 4*a*.

For example, the groove 4*a* is arranged on the movable furniture part 2 and the guide element 4*b* is connected to a furniture wall 3*a*, 3*b* in a mounted condition. Preferably, the guide element 4*b* of the guide device 4 is arranged on at least one of the spacer members 5*a*, 5*b*.

The groove 4*a* can be formed on or in a U-shaped profiled rail, the profiled rail being fixed in a region of the upper edge and/or in a region of the lower edge of the movable furniture part 2. The profiled rail with the groove 4*a* can extend substantially over an entire depth of the movable furniture part 2.

For example, the guide element 4*b* can include at least one wedge and/or at least one rotatable running wheel. The guide element 4*b* is movable along the groove 4*a* upon a movement of the movable furniture part 2.

Due to an excessive mechanical force application to the movable furniture part 2 in a direction extending transversely to the furniture wall 3*a*, it may occur that the movable furniture part 2 can collide with the furniture wall 3*a*. By virtue of a gliding device 10 (FIG. 2*b*) separate from the guide device 4 and yet to be described, such a collision can be prevented. The gliding device 10 can be arranged on the movable furniture part 2 or on the furniture wall 3*a* such that the movable furniture part 2 and the furniture wall 3*a* can be brought into a gliding contact with each other via the gliding device 10, when the predetermined distance becomes smaller.

Figure 1B:
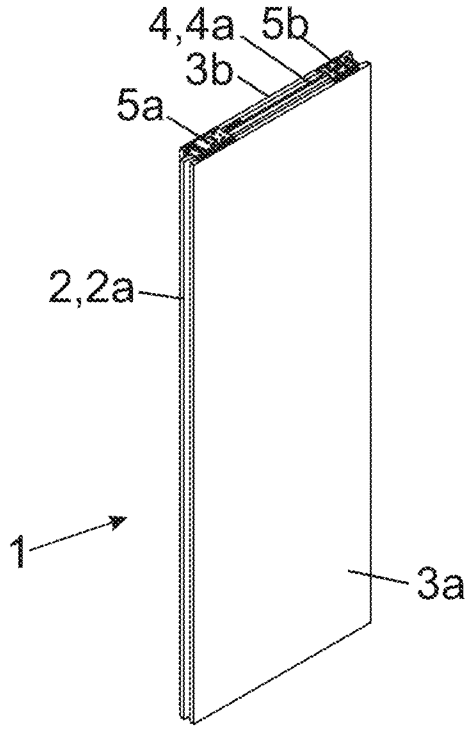

FIG. 1*b* shows the item of furniture 1 according to FIG. 1*a*, in which the movable furniture part 2 is located in a fully inserted condition within the insertion compartment 6.

Figure 2A:
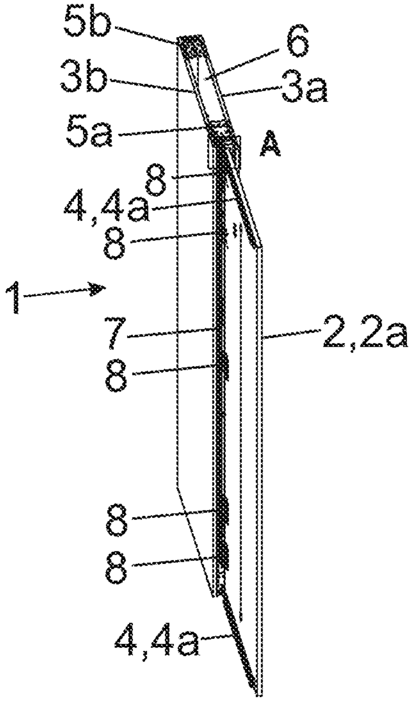
FIG. 2*a*, 2*b* show the item of furniture in a perspective view from the front and an enlarged detail view thereof.

FIG. 2*a* shows a perspective view of the item of furniture 1 according to FIGS. 1*a*, 1*b*. The insertion compartment 6 for receiving the movable furniture part 2 is formed between the furniture walls 3*a*, 3*b* spaced apart from each other in a parallel relationship. The movable furniture part 2 is pivotally supported on hinges 8 of a lengthy carrier 7, the carrier 7 being configured to be moved into the insertion compartment 6 in a direction extending parallel to the furniture walls 3*a*, 3*b*.

In the shown embodiment, two guide devices 4 are provided, and each of the guide devices 4 has a groove 4*a*. The grooves 4*a* are arranged in a region of the upper edge and in a region of the lower edge of the movable furniture part 2.

Figure 2B:
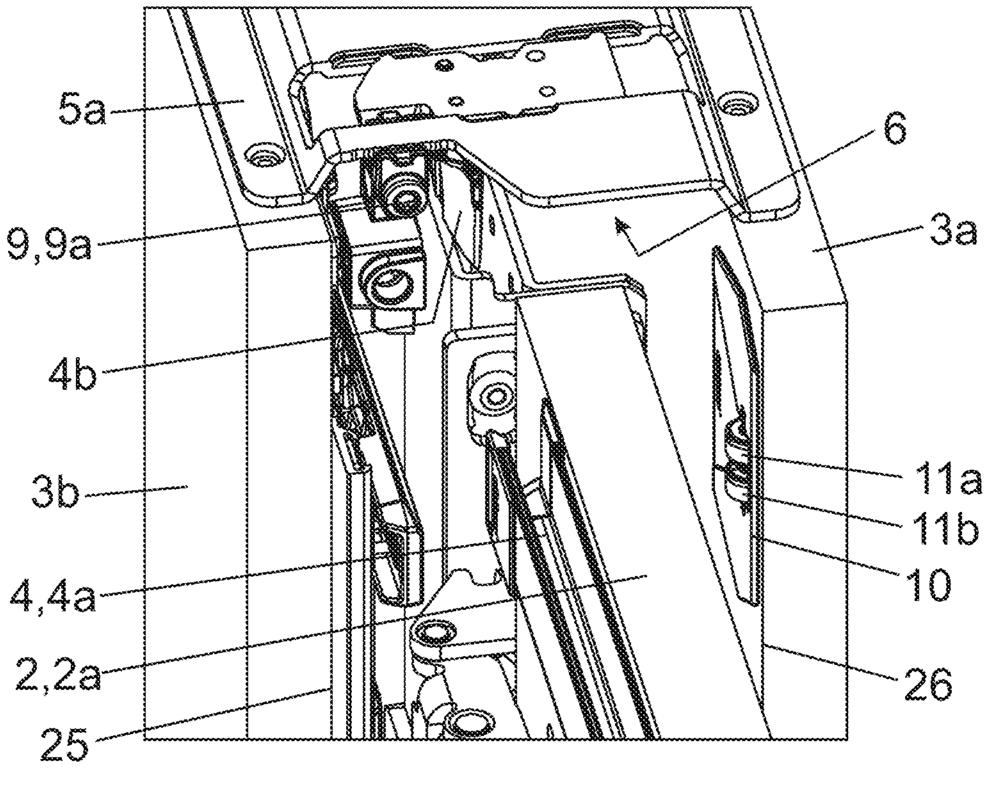

FIG. 2*b* shows the framed region "A" of FIG. 2*a* in an enlarged view. The two furniture walls 3*a*, 3*b* are connected to each other by spacer members 5*a*, 5*b*. Each of the guide devices 4 includes at least one guide element 4*b* configured to be moved along the groove 4*a* of the movable furniture part 2 upon a movement of the movable furniture part 2 into the insertion compartment 6.

In the shown embodiment, the guide element 4*b* is in the form of a wedge, the wedge being arranged on the spacer member 5*a*. By the guide device 4 with the guide element 4*b* moving into the groove 4*a*, the movable furniture part 2 can be guided with a predetermined distance with respect to the furniture wall 3*a*.

According to an embodiment, the at least one insertion compartment 6 is defined by two furniture walls 3*a*, 3*b* spaced apart from each other. The at least one movable furniture part 2, when moved into the insertion compartment 6, is movable about a frontal vertical corner 25 of a furniture wall 3*b*, and the at least one gliding device 10 is arranged on the other furniture wall 3*a*, preferably adjacent to a frontal vertical corner 26 of the other furniture wall 3*a*.

By at least one adjustment device 9, the predetermined distance of the movable furniture part 2 relative to the furniture wall 3*a* is adjustable. In the shown embodiment, the adjustment device 9 includes a rotatable adjustment wheel 9*a*. By a rotation of the adjustment wheel 9*a*, the guide element 4*b* is adjustable in a lateral direction, that is to say in a direction extending transversely to the furniture walls 3*a*, 3*b*.

Upon a mechanical force application to the movable furniture part 2 in a direction extending transversely to the longitudinal direction of the guide device 4, it is possible that the movable furniture part 2 collides with the furniture wall 3*a*. This collision can be prevented by a gliding device 10 separate from the guide device 4. The gliding device 10 is configured to be arranged on the at least one movable furniture part 2 or on the at least one furniture wall 3*a* such that the at least one movable furniture part 2 and the at least one furniture wall 3*a* can be brought into a gliding contact with each other via the gliding device 10 when the predetermined distance becomes smaller.

Figure 6A:
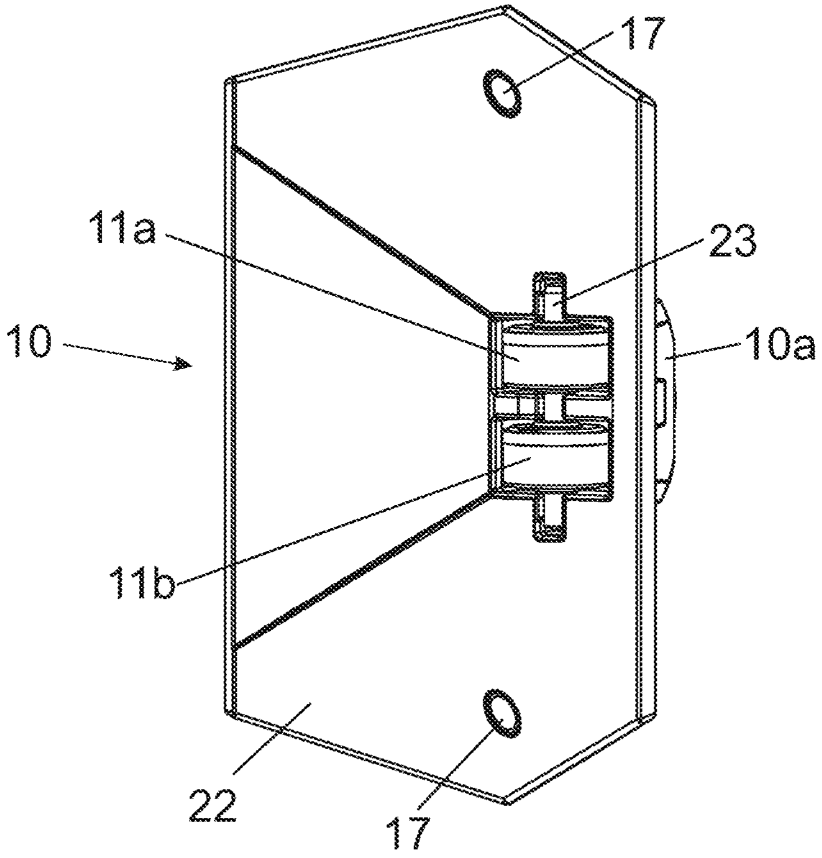
FIG. 6*a*, 6*b* show the gliding device in two different views.

According to possible embodiments, the at least one gliding device 10:

- includes at least one rolling body 11*a*, 11*b* configured to glidingly support the movable furniture part 2, preferably wherein the at least one rolling body 11*a*, 11*b* is rotatable about a substantially vertically extending axis in a mounted condition, and/or
- includes at least one rolling body 11*a*, 11*b* which is partially arranged within a material thickness of the movable furniture part 2 or of the furniture wall 3*a* in a mounted condition, and/or
- includes at least two rolling bodies 11*a*, 11*b* spaced apart from each other in a height direction in a mounted condition, preferably wherein the at least two rolling bodies 11*a*, 11*b* are rotatably supported on a common axis 23 (FIG. 6*a*).

Figure 3A:
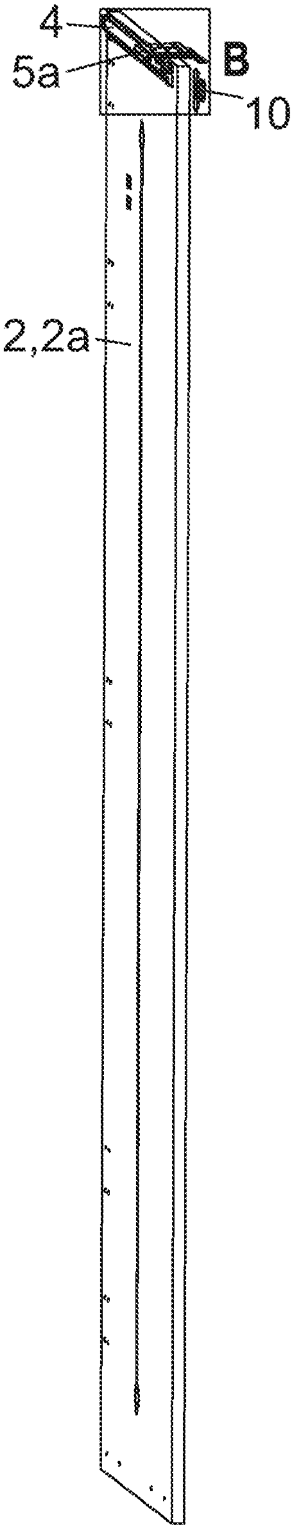
FIG. 3*a*, 3*b* show the movable furniture part in a retracted condition within the insertion compartment and an enlarged detail view thereof.

FIG. 3*a* shows a perspective view of the movable furniture part 2 located in a fully inserted condition within the insertion compartment 6. For the sake of improved overview, the two furniture walls 3*a*, 3*b* are not depicted.

Figure 3B:
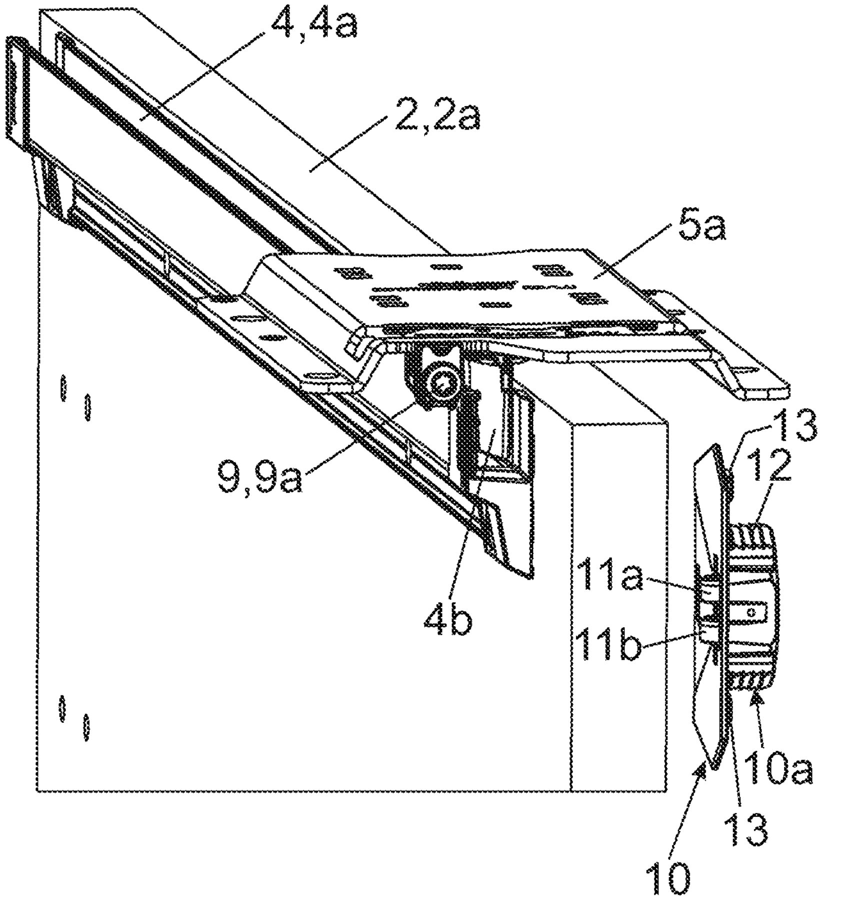

FIG. 3*b* shows the framed region "B" of FIG. 3*a* in an enlarged view. The guide element 4*b* is displaceably supported along the groove 4*a* of the movable furniture part 2, and the guide element 4*b* is arranged within the groove 4*a* in a fully inserted condition of the movable furniture part 2. In the shown embodiment, the groove 4*a* is formed or arranged on a profiled rail to be fixed to the movable furniture part 2.

According to possible embodiments, the gliding device 10:

includes at least one housing section 10*a* configured to be at least partially countersunk within a, preferably cylindrical, recess of the movable furniture part 2 or of the furniture wall 3*a*, preferably wherein the at least one housing section 10*a* is at least partially cylindrical, and/or includes at least one housing section 10*a* comprising holding elements 12, for example holding ribs, at least over a region for fixing the gliding device 10 to the furniture wall 3*a* or to the movable furniture part 2 in a friction-locked manner, and/or includes at least one fastening location 17 (FIG. 6*a*), preferably a hole for the passage of a screw, for fixing the gliding device 10 to the furniture wall 3*a* or to the movable furniture part 2, and/or includes at least one centering pin 13 configured to be inserted into a bore of the furniture wall 3*a* or of the movable furniture part 2.

Figure 4A:
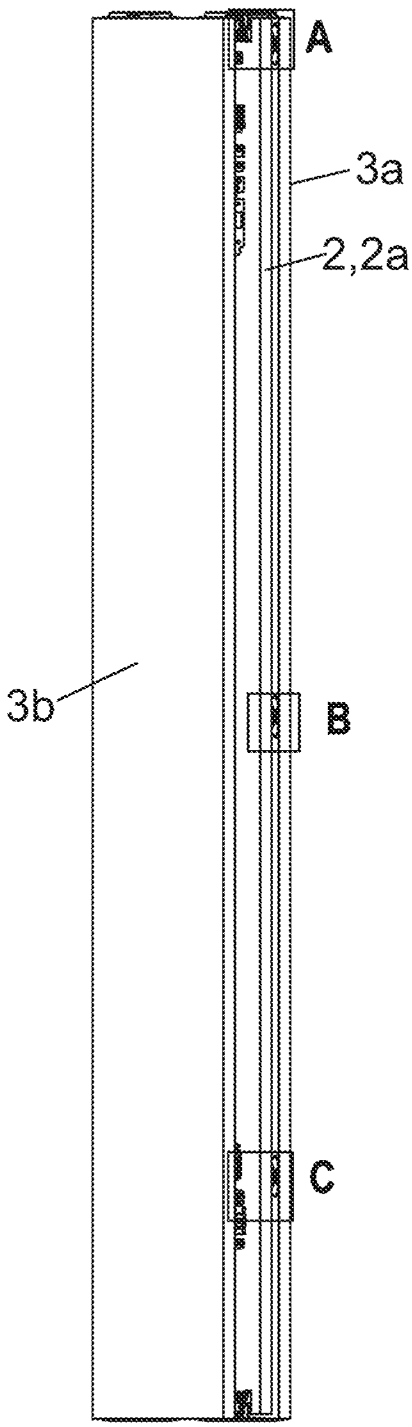
FIG. 4*a*-4*d* show the movable furniture part in a retracted condition within the insertion compartment and enlarged detail views thereof.

FIG. 4*a* shows the movable furniture part 2 in a retracted condition within the insertion compartment 6 and different detail views thereof. In the shown embodiment, three gliding devices 10 with rolling bodies 11*a*, 11*b* are provided. The gliding devices 10 are arranged on the furniture wall 3*a*, the gliding devices 10 being spaced apart from each other in a height direction of the movable furniture part 2. Basically, one single gliding device 10 would be sufficient, and the gliding device 10 has to be arranged approximately at half of a height of the movable furniture part 2.

Figure 4B:
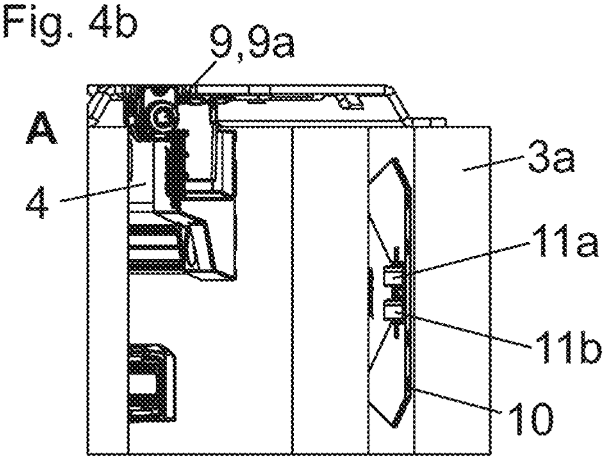

FIG. 4*b* shows the framed region "A" of FIG. 4*a* in an enlarged view.

Figure 4C:
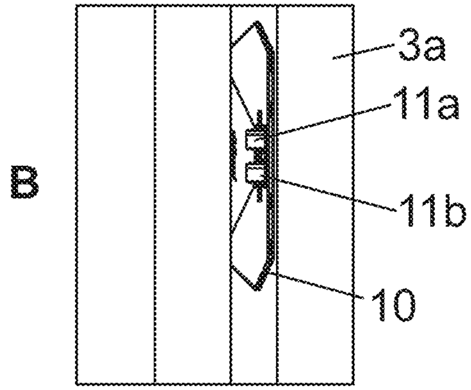

FIG. 4*c* shows the framed region "B" of FIG. 4*a* in an enlarged view.

Figure 4D:
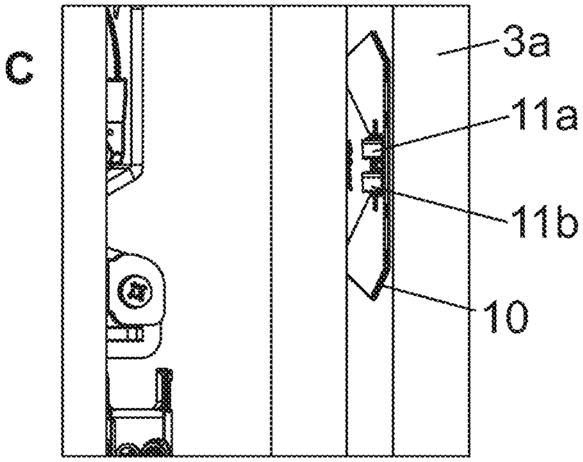

FIG. 4*d* shows the framed region "C" of FIG. 4*a* in an enlarged view.

Figure 5:
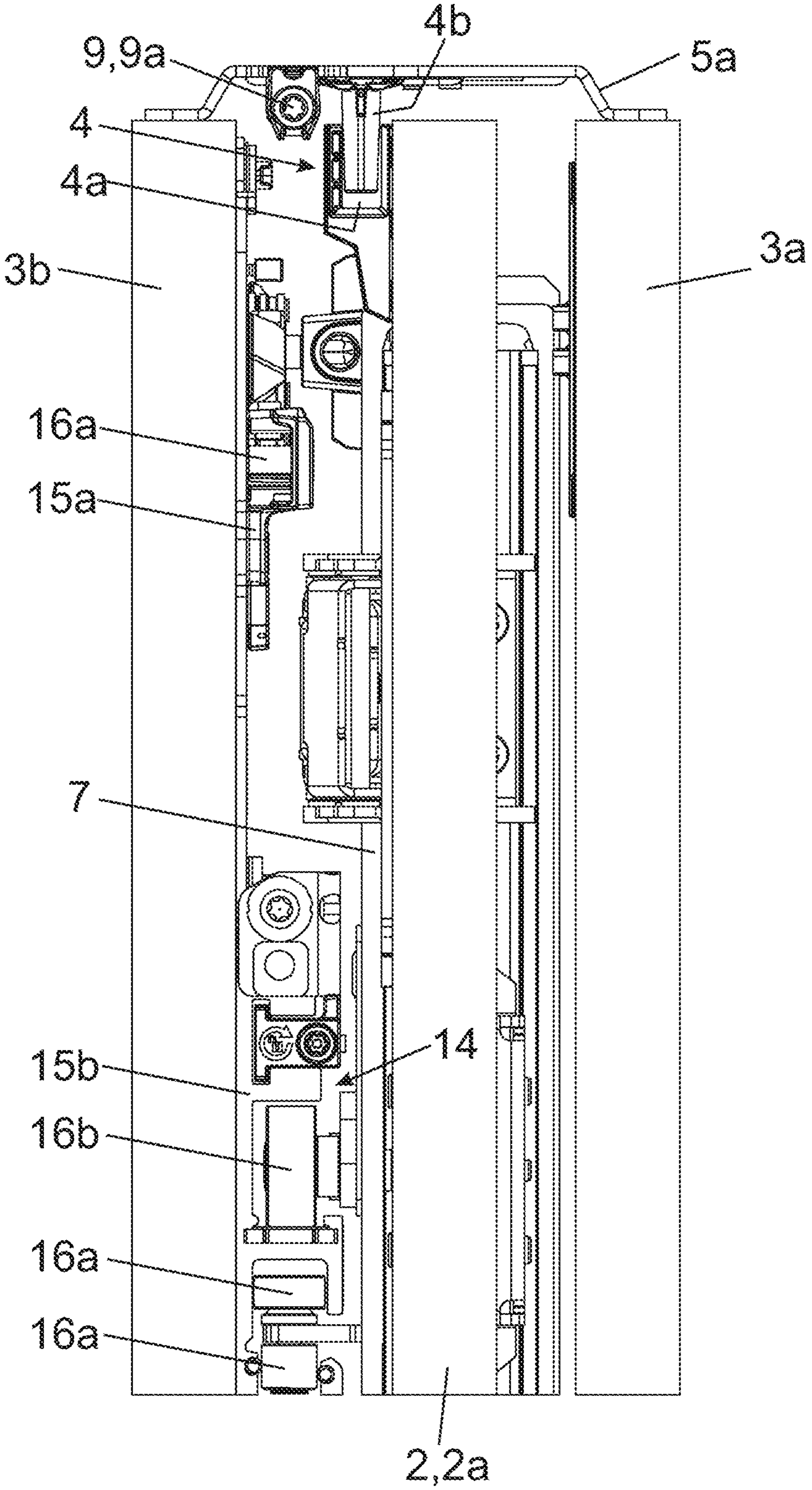
FIG. 5 is a cross-sectional view of the movable furniture part in a retracted condition within the insertion compartment.

FIG. 5 shows a cross-sectional view of the movable furniture part 2 in a retracted condition within the insertion compartment 6. The guide device 4 includes the guide element 4*b* which, in the shown position of the movable furniture part, is located within the groove 4*a*.

Guide rails 15*a*, 15*b* are fixed to the furniture wall 3*b*, and the carrier 7 for pivotally supporting the movable furniture part 2 is displaceable along the guide rails 15*a*, 15*b*. The carrier 7 is displaceably supported along the guide rails 15*a*, 15*b* via running wheels 16*a*, 16*b*. The running wheels 16*a* are rotatable about a vertically extending rotational axis, and the running wheels 16*b* are rotatable about a horizontally extending rotational axis. For example, the running wheels 16*a*, 16*b* can be arranged in a common running carriage 14 which is movable along the guide rails 15*a*, 15*b*.

FIG. 6*a* shows the gliding device 10 in a perspective view, the gliding device 10 having at least one rotatably supported rolling body 11*a*, 11*b* for glidingly supporting the movable furniture part 2. In the shown embodiment, two rolling bodies 11*a*, 11*b* are provided, the rolling bodies 11*a*, 11*b* being spaced apart from each other and being rotatably supported about a common axis 23.

The gliding device 10 includes a base body 22 having at least one housing section 10*a* configured to be at least partially countersunk within a, preferably cylindrical, recess of the movable furniture part 2 or of the furniture wall 3*a*. The recess can be a cylindrical bore having a diameter of 35 mm.

The at least one rolling body 11*a*, 11*b* is partially arranged within the countersinkable housing portion 10*a*. This offers the possibility that the at least one rolling body 11*a*, 11*b*, in a mounted condition of the gliding device 10, can be arranged in a space-saving manner at least partially within a material thickness of the furniture wall 3*a* of or of the movable furniture part 2.

The gliding device 10 can include at least one fastening location 17, preferably at least one hole for the passage of a screw, for fixing the gliding device 10 to the furniture wall 3*a* or to the movable furniture part 2. It is also possible that the fastening location 17 of the gliding device 10 includes at least one, preferably expandable, dowel.

According to a further embodiment, the gliding device 10 includes at least two fastening locations 17, preferably holes for the passage of a screw, and the distance of the middle axes of the two fastening locations 17 are spaced apart from each other with a predetermined grid spacing, preferably with a grid dimension of 45 mm.

This offers the opportunity to fix the gliding device 10 to predefined hole grids via the fastening locations 17, the hole grids being industrially pre-assembled to a furniture carcass 21 (FIG. 7*a*-7*c*) or to a furniture panel 3*a*, 3*b*. For the assembling person, the mounting operation can be considerably facilitated, because the gliding device 10 can be easily fixed to these predefined hole grids.

Figure 6B:
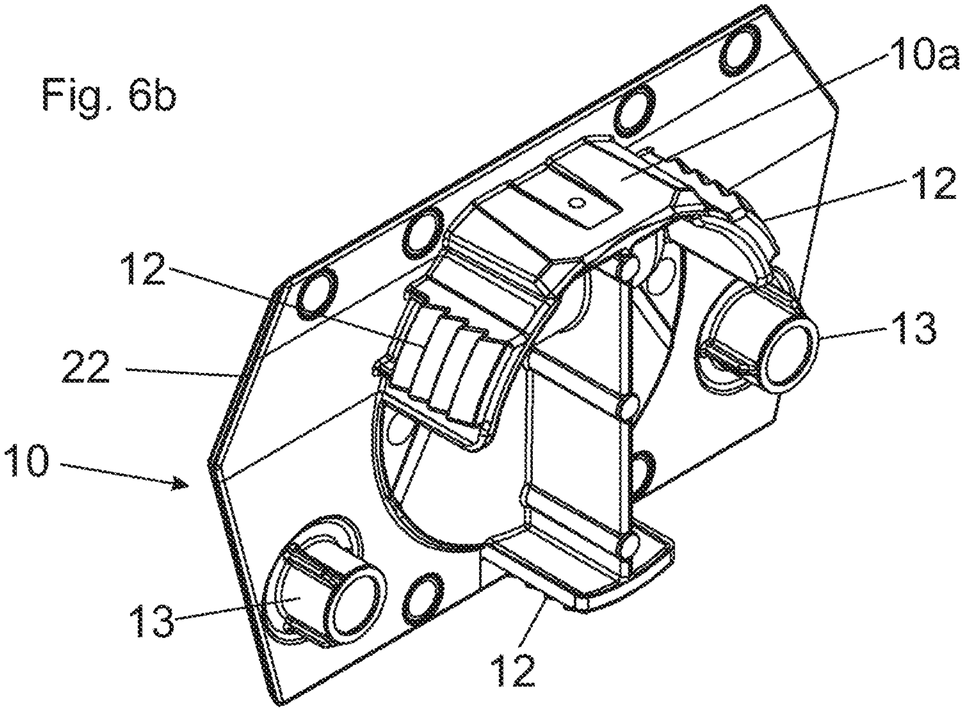

FIG. 6*b* shows the gliding device 10 in a perspective view from the rear. As an alternative or in addition to the at least one fastening location 17, the gliding device 10 can include at least one holding element 12, preferably a plurality of holding elements 12, for fixing the gliding device 10 to the furniture wall 3*a* or to the movable furniture part 2 in a friction-locked manner. Moreover, the gliding device 10 can include at least one centering pin 13 configured to be inserted into a bore of the furniture wall 3*a* or of the movable furniture part 2.

The countersinkable housing section 10*a* of the gliding device 10 can be configured such that the housing section 10*a* can be arranged within a cylindrical bore having a diameter of 35 mm, and can be fixed within the bore, preferably exclusively in a friction-locked manner.

FIG. 7*a*-7*d* show an item of furniture 1 comprising two door wings 2*a*, 2*b* hingedly connected to each other, the door wings 2*a*, 2*b* being shown in different positions relative to a furniture carcass 21. The door wings 2*a*, 2*b* are movable by a guide system 18 relative to the furniture carcass 21 between a first position, in which the two door wings 2*a*, 2*b* are aligned substantially parallel to each other, and at least a second position, in which the two door wings 2*a*, 2*b* are aligned substantially coplanar to each other.

Figure 7A:
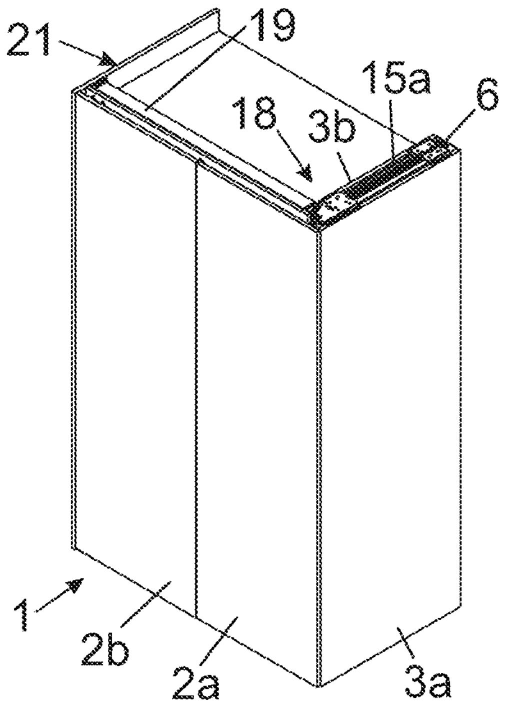
FIG. 7*a*-7*d* show the item of furniture with two door wings hingedly connected to each other in different positions relative to a furniture carcass.

FIG. 7*a* shows the door wings 2*a*, 2*b* in a coplanar position to each other. The guide system 18 includes at least one guide rail 19 configured to guide the door wings 2*a*, 2*b* along a front face of the furniture carcass 21. The insertion compartment 6 is formed between the two furniture walls 3*a*, 3*b*. At least one guide rail 15*a* is fixed to the furniture wall 3*b*, the guide rail 15*a* being configured to guide the door wings 2*a*, 2*b* along the furniture walls 3*a*, 3*b* in a direction extending transversely to the longitudinal direction of the guide rail 19.

Figure 7B:
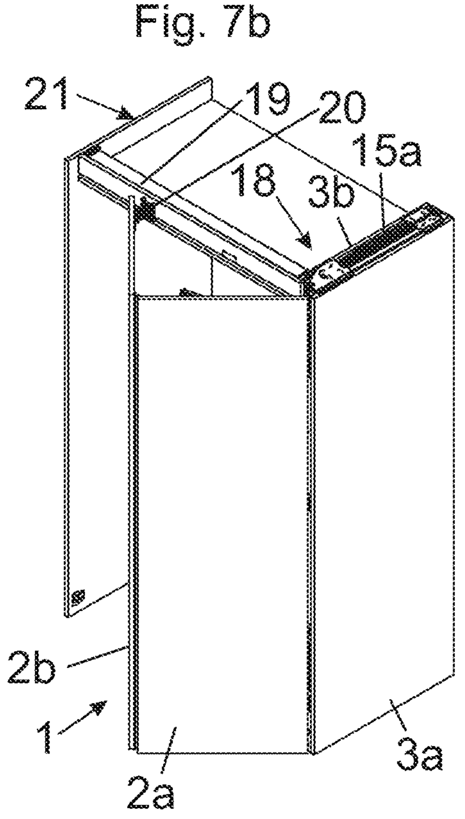

FIG. 7*b* shows the door wings 2*a*, 2*b* in an angled position to each other. The door wings 2*a*, 2*b* are hingedly connected to each other via a vertically extending axis, and a running carriage 20 connected to the door wing 2*b* is displaceable along the guide rail 19.

Figure 7C:
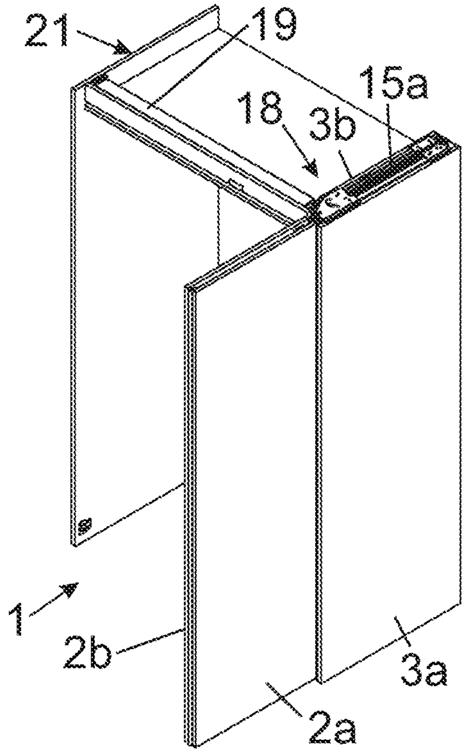

FIG. 7*c* shows the door wings 2*a*, 2*b* in a parallel position relative to each other. Here, the carrier 7 is located in a transfer position in which the carrier 7 adjoins the guide rail 19 in a longitudinal direction, so that the running carriage 20 connected to the door wing 2*b* can be transferred to and from between the guide rail 19 and the carrier 7. From the position shown in FIG. 7*c*, the door wings 2*a*, 2*b* can be moved into the insertion compartment 6.

Figure 7D:
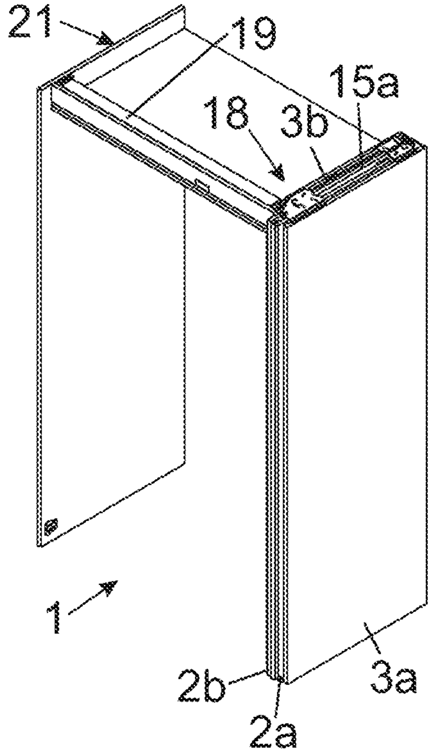

FIG. 7*d* shows the door wings 2*a*, 2*b* which are fully inserted into the insertion compartment 6, and the opening formed by the furniture carcass 21 is entirely unblocked by the door wings 2*a*, 2*b*.

Figure 8:
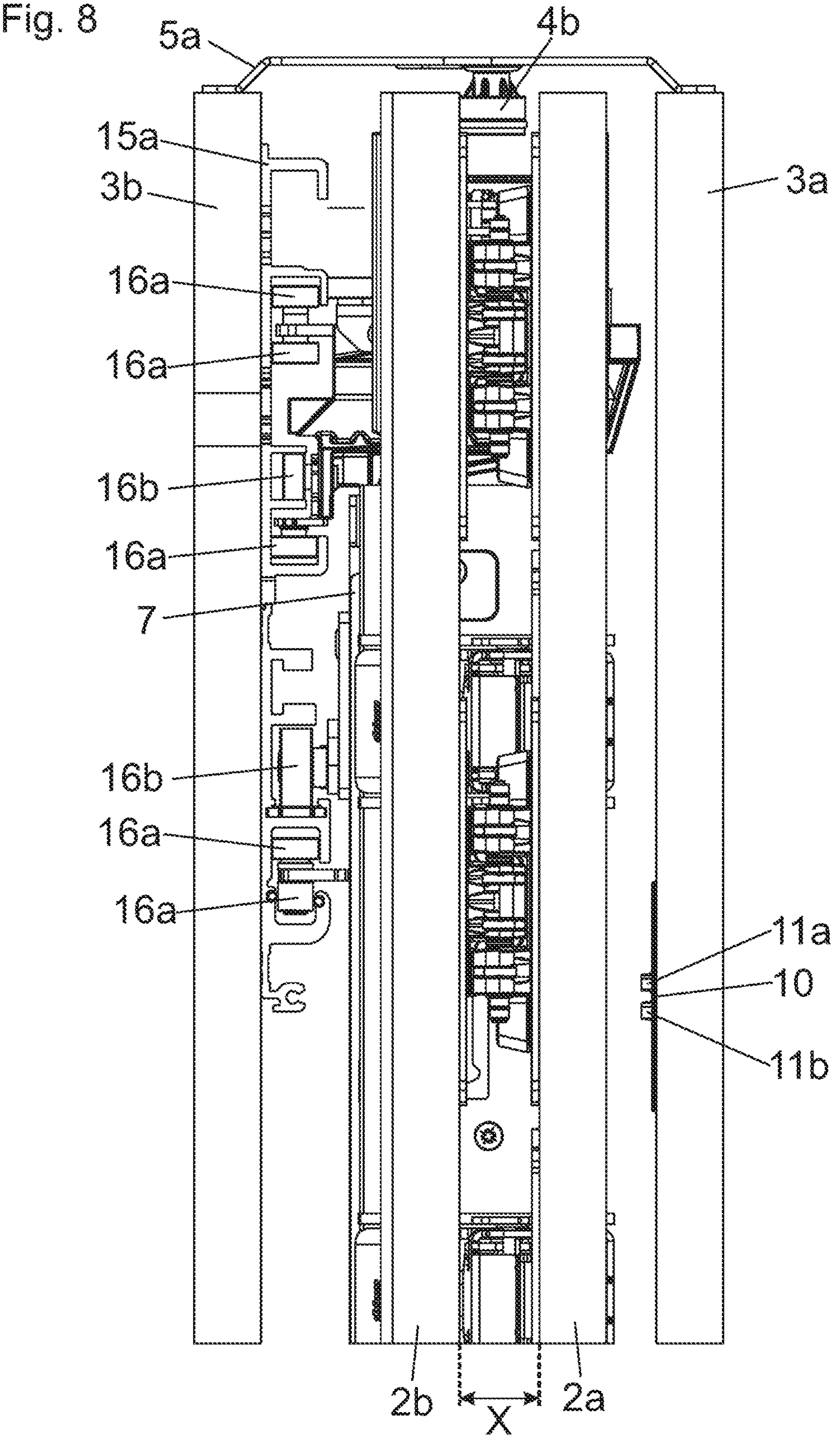
FIG. 8 shows a cross-sectional view of the two door wings according to FIGS. 7*a*-7*d* in a fully inserted condition within the insertion compartment.

FIG. 8 shows a cross-sectional view of the door wings 2*a*, 2*b* according to FIG. 7*a*-7*d* in a fully inserted condition within the insertion compartment 6. The carrier 7 for pivotally supporting the door wing 2*a* is displaceably supported along the guide rail 15*a* fixed to the furniture wall 3*b* via running wheels 16*a*, 16*b*. By the running wheels 16*a* having a vertical rotational axis, the carrier 7 can be guided in a lateral direction along the guide rail 15*a*. On the contrary, the running wheels 16*b* having a horizontal rotational axis bear a weight force of the door wings 2*a*, 2*b*.

With this embodiment, the guide element 4*b* is in the form of a rotatable roller configured to be arranged between the two door wings 2*a*, 2*b* when the door wings 2*a*, 2*b* are aligned in a parallel position relative to each other. A diameter of the guide element 4*b* configured as a roller is smaller than the distance X which adopt the two door wings 2*a*, 2*b* in a parallel position to each other. Preferably, the guide element 4*b* in the form of the rotatable roller is supported on at least one of the spacer members 5*a*, 5*b*.

Figure 9A:
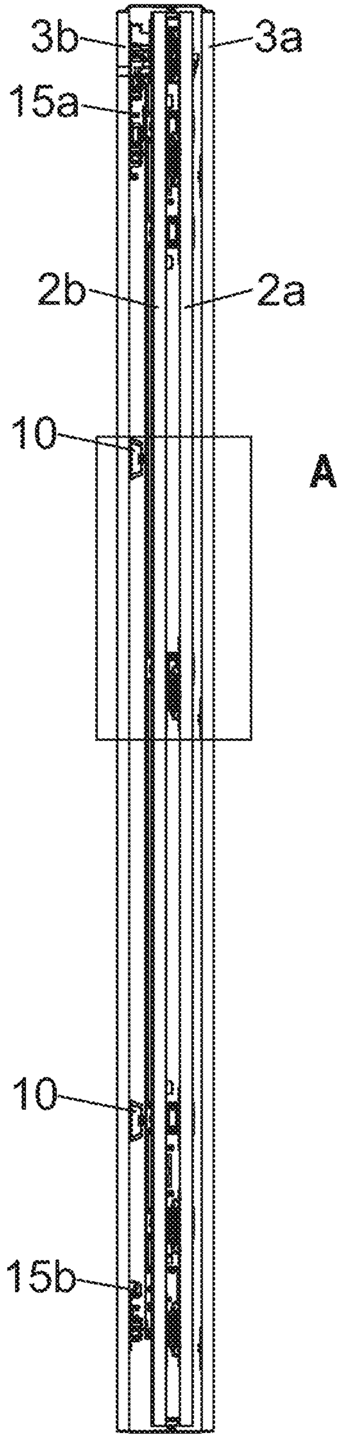
FIG. 9*a*, 9*b* show the door wings according to FIGS. 7*a*-7*d* in a fully inserted condition within the insertion compartment in a cross-sectional view and an enlarged detail view thereof.

FIG. 9*a* shows a cross-sectional view of the door wings 2*a*, 2*b* according to FIGS. 7*a*-7*d* in a fully inserted condition within the insertion compartment 6. Two guide rails 15*a*, 15*b* spaced apart from each other in the height direction are fixed to the furniture wall 3*b*, and the two door wings 2*a*, 2*b* are movable along the guide rails 15*a*, 15*b* via the carrier 7. At least one gliding device 10, preferably a plurality of gliding devices 10, can be arranged on the furniture wall 3*a* as well as on the furniture wall 3*b*.

While the gliding devices 10 arranged on the furniture wall 3*a* are configured according to FIGS. 6*a*, 6*b* so as to adopt a very compact design, the gliding devices 10 arranged on the furniture wall 3*b* must be built broader so as to bridge the guide rails 15*a*, 15*b* fixed to the furniture wall 3*b*, so that the rolling bodies 11*a*, 11*b* of the gliding device 10 can contact the door wing 2*b*.

Figure 9B:
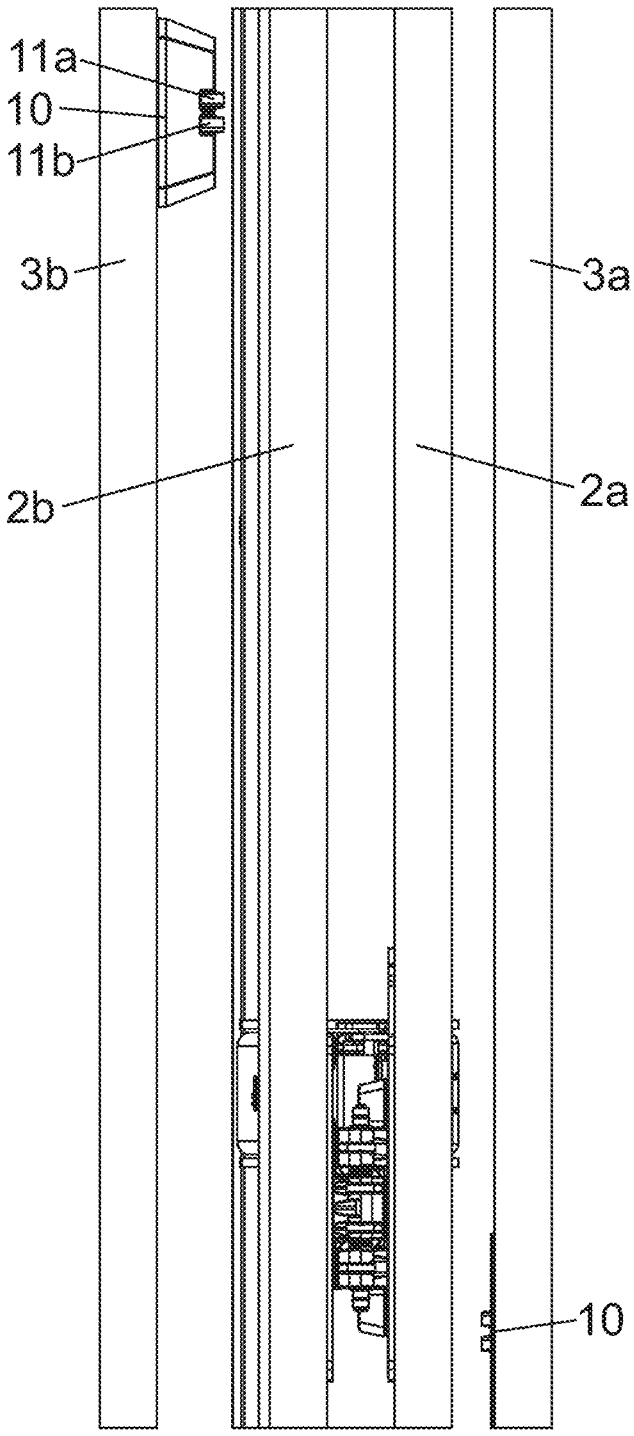

FIG. 9*b* shows the framed region "A" of FIG. 9*a* in an enlarged view. At least one gliding device 10 is arranged on the furniture wall 3*b*, the gliding device 10 having a broader construction than the gliding device 10 fixed to the furniture wall 3*a*. Therefore, the running contour of the rolling bodies 11*a*, 11*b* intended for the contact with the door wing 2*b* has a larger distance with respect to a side face of the furniture wall 3*b* than the largest occurring width of the guide rails 15*a*, 15*b*.

Figure 10A:
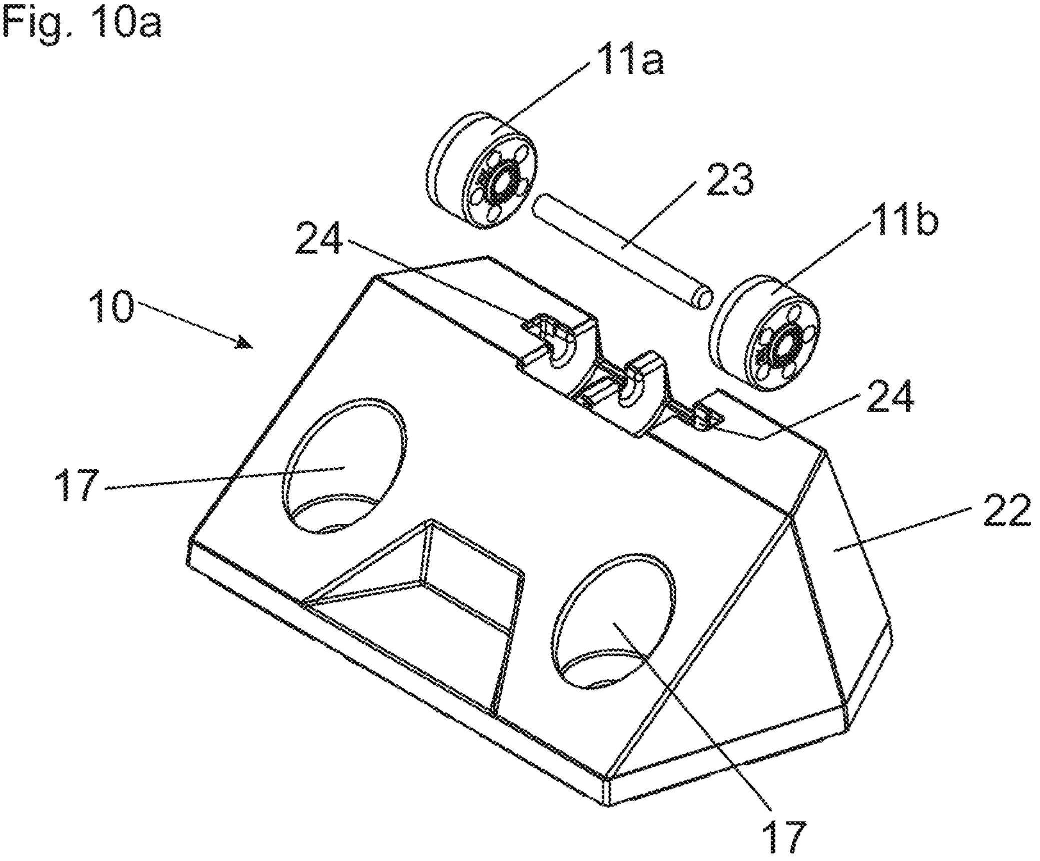
FIG. 10*a*, 10*b* show a further embodiment of a gliding device in two different perspective views.

FIG. 10*a* shows the gliding device 10 according to FIG. 9*b*, the gliding device 10 being configured to be fixed to the furniture wall 3*b*. For bridging a width of the guide rails 15*a*, 15*b*, the rolling bodies 11*a*, 11*b* must be arranged with a larger distance to the side face of the furniture wall 3*b*, so that the rolling bodies 11*a*, 11*b* are able to contact the door wing 2*b*. The gliding device 10 includes at least one base body 22 having at least one fastening location 17, for example a hole for the passage of a screw, and the gliding device 10 is to be fixed to a furniture wall 3*a*, 3*b* or to a movable furniture part 2 via the fastening location 17.

The base body 22 of the gliding device 10 includes two mutually spaced bearings 24 for releasably, preferably clampingly, fixing the axis 23 on which the two rolling bodies 11*a*, 11*b* are rotatably supported.

Figure 10B:
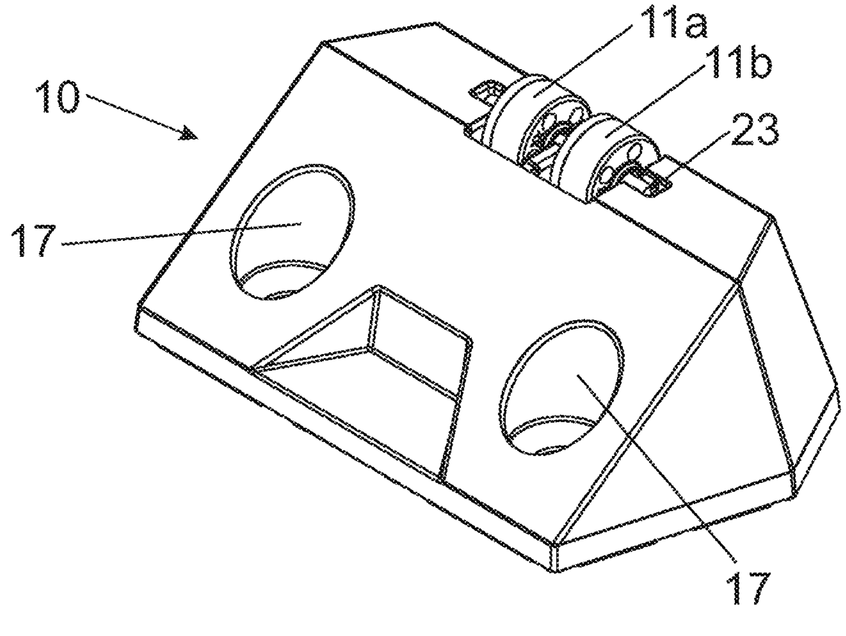

FIG. 10*b* shows the gliding device 10 according to FIG. 10*a* in an assembled condition, in which the axis 23 is configured to be connected to the base body 22 in a form-locking manner and/or in a force-locking manner.

The invention claimed is:

1. A guide system for guiding a movable furniture part in a direction extending parallel to a furniture wall, the guide system comprising:

a guide device for guiding the movable furniture part, the guide device being configured to guide the movable furniture part such that the movable furniture part is spaced apart from the furniture wall by a predetermined distance; and a gliding device separate from the guide device, the gliding device being configured to be arranged on the movable furniture part or on the furniture wall such that the movable furniture part and the furniture wall are brought into a gliding contact with each other via the gliding device when a distance between the movable furniture part and the furniture wall becomes smaller than the predetermined distance due to a force applied to the movable furniture part in a direction transverse to a longitudinal direction of the guide device, wherein the guide device includes a groove and a guide element configured to partially engage into the groove.

2. The guide system according to claim 1, wherein the gliding device, in a condition in which the movable furniture part is guided at the predetermined distance from the furniture wall, is without contact to the movable furniture part or to the furniture wall.

3. The guide system according to claim 1, wherein the gliding device:

includes at least one rolling body configured to glidingly support the movable furniture part; or includes at least one rolling body which, in a mounted condition, is partially arranged within a material thickness of the movable furniture part or of the furniture wall; or includes at least two rolling bodies which, in a mounted condition, are spaced apart from each other in a height direction; or includes at least one housing section configured to be at least partially countersunk within a recess of the movable furniture part or of the furniture wall; or includes at least one housing section comprising holding elements at least over a region for fixing the gliding device to the furniture wall or to the movable furniture part in a friction-locked manner; or includes at least one fastening location for fixing the gliding device to the furniture wall or to the movable furniture part; or includes at least one centering pin configured to be inserted into a bore of the furniture wall or of the movable furniture part.

4. The guide system according to claim 3, wherein the gliding device:

includes the at least one rolling body configured to glidingly support the movable furniture part, and the at least one rolling body is rotatable about a substantially vertically extending rotational axis in a mounted condition; or includes the at least two rolling bodies which, in a mounted condition, are spaced apart from each other in the height direction, and the at least two rolling bodies are rotatably supported about a common axis; or includes the at least one housing section configured to be at least partially countersunk within the recess of the movable furniture part or of the furniture wall, and the at least one housing section is at least partially cylindrical; or includes the at least one fastening location, and the at least one fastening location is a hole for the passage of a screw.

5. The guide system according to claim 1, wherein the groove is configured to be arranged on the movable furniture part and the guide element is configured to be connected to the furniture wall in a mounted condition.

6. The guide system according to claim 1, wherein the guide system or the guide device includes at least one guide rail for guiding the movable furniture part in a direction extending parallel to the furniture wall, wherein at least one running wheel connected to the movable furniture part is displaceable along the at least one guide rail.

7. The guide system according to claim 1, wherein the guide system includes at least one guide rail configured to guide the movable furniture part along a front face of a furniture carcass.

8. The guide system according to claim 1, wherein the guide system includes an adjustment device configured to adjust the predetermined distance between the movable furniture part and the furniture wall.

9. The guide system according to claim 8, wherein the adjustment device includes at least one rotatable adjustment wheel.

10. The guide system according to claim 1, wherein the movable furniture part is movable by the guide system between a first position, in which the movable furniture part is aligned substantially parallel to the furniture wall, and a second position, in which the movable furniture part is aligned substantially perpendicular to the furniture wall.

11. The guide system according to claim 1, wherein the guide system includes at least one carrier configured to pivotally support the movable furniture part.

12. The guide system according to claim 11, wherein the at least one carrier is movable in a direction extending parallel to at least one furniture wall.

13. An item of furniture comprising:

a furniture carcass;

a movable furniture part; and the guide system according to claim 1 for guiding the movable furniture part relative to the furniture carcass.

14. The item of furniture according to claim 13, wherein the item of furniture includes an insertion compartment for at least partially receiving the movable furniture part.

15. The item of furniture according to claim 14, wherein:

the insertion compartment extends in a depth direction of the item of furniture; or the insertion compartment is defined by two mutually spaced furniture walls connected to each other by at least one spacer member; or the insertion compartment is defined by two mutually spaced furniture walls, wherein the movable furniture part is movable about a frontal vertical corner of one of the two mutually spaced furniture walls upon a movement into the insertion compartment, and the gliding device is arranged on the other of the two mutually spaced furniture walls.

16. The item of furniture according to claim 15, wherein:

the insertion compartment is defined by the two mutually spaced furniture walls connected to each other by the at least one spacer member, and a guide element of the guide device is arranged on the at least one spacer member; or the at least one insertion compartment is defined by the two mutually spaced furniture walls and the movable furniture part is movable about the frontal vertical corner of the one of the two mutually spaced furniture walls upon a movement into the insertion compartment, and the gliding device is arranged on the other of the two mutually spaced furniture walls and adjacent to a frontal vertical corner of the other of the two mutually spaced furniture walls.

17. The item of furniture according to claim 13, wherein the gliding device is arranged approximately at half of a height of the movable furniture part.

18. The item of furniture according to claim 13, wherein the item of furniture includes at least two door wings hingedly connected to each other, the at least two door wings being movable by the guide system relative to the furniture carcass between a first position, in which the at least two door wings are aligned substantially parallel to each other, and at least a second position, in which the at least two door wings are aligned substantially coplanar to each other.

19. The item of furniture according to claim 18, wherein the guide device includes at least one guide element in the form of a rotatable roller, the roller being configured to be arranged between the at least two door wings in the first position, and wherein a diameter of the rotatable roller is smaller than a distance between the at least two door wings in the first position.

20. A guide system for guiding a movable furniture part relative to a furniture wall in which the movable furniture part is spaced apart from the furniture wall by a predetermined distance, the guide system comprising:

a guide device for guiding the movable furniture part; and a gliding device separate from the guide device, the gliding device being configured to be arranged on the movable furniture part or on the furniture wall such that the movable furniture part and the furniture wall are brought into a gliding contact with each other via the gliding device when a distance between the movable furniture part and the furniture wall becomes smaller than the predetermined distance due to a force applied to the movable furniture part in a direction transverse to a longitudinal direction of the guide device, wherein the gliding device includes a cylindrical housing section configured to be countersunk in a cylindrical recess of one of the movable furniture part and the furniture wall, and at least one movably-supported rolling body configured to support the movable furniture part, and wherein the at least one movably-supported rolling body, in a mounted condition, is partially arranged within a material thickness of the one of the movable furniture part and the furniture wall.

* * * * *